(12) United States Patent
Goldberg et al.

(10) Patent No.: US 9,411,839 B2
(45) Date of Patent: *Aug. 9, 2016

(54) INDEX CONFIGURATION FOR SEARCHABLE DATA IN NETWORK

(71) Applicant: A9.com, Inc., Palo Alto, CA (US)

(72) Inventors: Jonathan Michael Goldberg, San Francisco, CA (US); Jonathan Blake Handler, Redwood City, CA (US); Asif Mansoor Ali Makhani, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,109

(22) Filed: Jun. 2, 2015

(65) Prior Publication Data
US 2015/0261802 A1    Sep. 17, 2015

Related U.S. Application Data

(63) Continuation of application No. 13/650,961, filed on Oct. 12, 2012, now Pat. No. 9,047,326.

(51) Int. Cl.
*G06F 17/30* (2006.01)
*H04L 29/08* (2006.01)

(52) U.S. Cl.
CPC .... *G06F 17/30321* (2013.01); *G06F 17/30312* (2013.01); *H04L 67/10* (2013.01); *G06F 17/30339* (2013.01); *G06F 17/30619* (2013.01)

(58) Field of Classification Search
CPC .................. G06F 17/30321; G06F 17/30339; G06F 17/30619; G06F 17/30312; H04L 67/10
USPC ........................................................ 707/753
See application file for complete search history.

(56) References Cited

U.S. PATENT DOCUMENTS

| 5,991,860 A | 11/1999 | Gross |
| 6,185,666 B1 | 2/2001 | Murray et al. |

(Continued)

FOREIGN PATENT DOCUMENTS

| CN | 201380053433.7 | 8/2015 |
| EP | 2907034 | 8/2015 |

(Continued)

OTHER PUBLICATIONS

Written Opinion and International Search report issued in PCT/US2013/064731 dated Jan. 29, 2014.

(Continued)

*Primary Examiner* — Rehana Perveen
*Assistant Examiner* — Tiffany Thuy Bui
(74) *Attorney, Agent, or Firm* — Hogan Lovells US LLP (57) ABSTRACT

An entity using a computing device can upload searchable data to a network service to be indexed and stored. The data can include a plurality of data fields, each data field having one or more associated values. The network service can analyze the data fields and their respectively associated values to determine data field types for the data fields and search options to be enabled for the data fields. Based at least in part on the data field types and the search options, the network service can generate a search index configuration/schema. Based at least in part on the generated search index configuration/schema, the network service can generate a search index for the data. In some embodiments, the network service can also convert the data into a format compatible with the search index.

17 Claims, 7 Drawing Sheets

(56) References Cited

U.S. PATENT DOCUMENTS

| | | | |
|---|---|---|---|
| 7,092,870 B1* | 8/2006 | Chen et al. | 704/9 |
| 7,685,109 B1 | 3/2010 | Ransil et al. | |
| 7,716,168 B2* | 5/2010 | Selca et al. | 707/805 |
| 7,788,233 B1 | 8/2010 | Iyer et al. | |
| 7,912,842 B1* | 3/2011 | Bayliss | 707/749 |
| 8,190,593 B1 | 5/2012 | Dean | |
| 8,266,173 B1 | 9/2012 | Reztlaff et al. | |
| 8,539,197 B1 | 9/2013 | Marshall et al. | |
| 9,047,326 B2 | 6/2015 | Goldberg et al. | |
| 2002/0103876 A1* | 8/2002 | Chatani et al. | 709/217 |
| 2007/0033340 A1 | 2/2007 | Tulskie et al. | |
| 2007/0043923 A1 | 2/2007 | Shue | |
| 2008/0086451 A1* | 4/2008 | Torres et al. | 707/3 |
| 2008/0243778 A1* | 10/2008 | Behnen et al. | 707/3 |
| 2009/0198670 A1* | 8/2009 | Shiffer et al. | 707/5 |
| 2010/0011311 A1 | 1/2010 | Kodosky et al. | |
| 2010/0011368 A1 | 1/2010 | Arakawa et al. | |
| 2010/0088318 A1 | 4/2010 | Kan | |
| 2010/0161569 A1 | 6/2010 | Schreter | |
| 2010/0169361 A1* | 7/2010 | Chen et al. | 707/769 |
| 2010/0228721 A1* | 9/2010 | Mok et al. | 707/711 |
| 2011/0131202 A1* | 6/2011 | Cohen et al. | 707/723 |
| 2011/0225165 A1 | 9/2011 | Burstein | |
| 2012/0011311 A1 | 1/2012 | Orikasa et al. | |
| 2012/0072694 A1 | 3/2012 | Yochai et al. | |
| 2012/0089610 A1* | 4/2012 | Agrawal et al. | 707/741 |
| 2012/0143873 A1 | 6/2012 | Saadat | |
| 2012/0166751 A1 | 6/2012 | Matsumoto et al. | |
| 2012/0191577 A1* | 7/2012 | Gonsalves et al. | 705/27.2 |
| 2013/0097134 A1* | 4/2013 | Thompson et al. | 707/696 |
| 2014/0025626 A1* | 1/2014 | Mefford et al. | 707/603 |
| 2014/0181071 A1 | 6/2014 | Pidduck et al. | |

FOREIGN PATENT DOCUMENTS

| | | |
|---|---|---|
| KR | 2002-0066971 | 8/2002 |
| WO | 2011/118427 | 9/2011 |

OTHER PUBLICATIONS

Non Final Office Action issued in U.S. Appl. No. 13/650,931 dated May 1, 2015.

Written Opinion and Search Report issued in Singaporean Application No. 11201502828P dated Aug. 14, 2015.

International Preliminary Report issued in PCT/US2013/064731 dated Apr. 14, 2015.

Notification of Publication of Patent Application and Entry Into Substantive Examination issued in Chinese Application No. 201380053433.7 dated Aug. 12, 2015.

Non Final Office Action issued in U.S. Appl. No. 13/650,961 dated Aug. 8, 2014.

Notice of Allowance issued in U.S. Appl. No. 13/650,961 dated Feb. 9, 2015.

Non Final Office Action issued in U.S. Appl. No. 13/650,931 dated Sep. 18, 2014.

Final Office Action issued in U.S. Appl. NO. 13/650,931 dated Oct. 13, 2015.

"Examination Report dated Feb. 15, 2016" received in Australian Application No. 2013328901.

Supplementary European Search Report dated Apr. 19, 2016 received in European Application No. 13845541.5.

Non Final Rejection dated Mar. 31, 2016 received in Korean Application No. 10-2015-7012030.

* cited by examiner

FIG. 8

INDEX CONFIGURATION FOR SEARCHABLE DATA IN NETWORK

CROSS-REFERENCES TO RELATED APPLICATIONS

This application is a continuation of allowed U.S. application Ser. No. 13/650,961, entitled "INDEX CONFIGURATION FOR SEARCHABLE DATA IN NETWORK," filed Oct. 12, 2012, now U.S. Pat. No. 9,047,326; of which the full disclosure of this application is incorporated herein by reference for all purposes.

BACKGROUND

Computing devices are often used to communicate over a network such as the Internet. Network based services offered by a service provider are becoming more commonplace. Computing devices are frequently used to connect to a network based service, which can provide services such as storing searchable data to be used/retrieved by the computing devices or providing additional processing power to the computing devices. With respect to the network based storage of searchable data, users of computing devices typically need to choose a configuration and/or format for their data, so that their data can be indexed and stored by the network based service. Conventional approaches typically require users to determine an appropriate configuration for their data. Conventional approaches can also demand a format to which the user's data must comply, thereby requiring the users to convert their data to the format. This can be inconvenient, cumbersome, or difficult to users who want to use the network based service for storage and search, thereby reducing the overall user experience.

BRIEF DESCRIPTION OF THE DRAWINGS

Various embodiments in accordance with the present disclosure will be described with reference to the drawings, in which.

DETAILED DESCRIPTION

Systems and methods to generate an index configuration that can be used to generate a search index for data received over at least one network are described. At least some embodiments enable a computing device to upload data over a network (e.g., the Internet) onto a storage allocation provided by a network service (i.e., network service provider). The network service can analyze the uploaded data to determine a type of data field (i.e., data field type) for each data field in the plurality of data fields. The network service can analyze the uploaded data to determine whether or not to enable one or more search options for each data field in the plurality of data fields included in the uploaded data.

At least some embodiments enable a computing device to upload data over a network (e.g., the Internet) onto a storage allocation provided by a network service (i.e., network service provider, network based service, etc.). One or more users/entities (e.g., using one or more computing devices) can search for the uploaded data over the network utilizing a search index, which can be provided by the network service.

In some embodiments, the uploaded data can include a plurality of data fields. The network service can analyze the uploaded data to determine a type of data field (i.e., data field type) for each data field in the plurality of data fields. For example, each data field can be of a type including an integer type, a text type, or a literal type.

Moreover, the network service can analyze the uploaded data to determine whether or not to enable one or more search options for each data field in the plurality of data fields included in the uploaded data. For example, the network service can determine, for each respective data field, whether or not to enable an option that would include the respective data field in a search index to be generated. The network service can also determine, for each respective data field, whether to enable an option that would calculate a facet count for the respective data field. Further, the network service can determine, for each respective data field, whether to enable an option that would return/provide the value associated with the respective data field in response to a search query.

In some embodiments, the network service can generate an index configuration (i.e., search index configuration, schema, index settings, etc.) for the data based at least in part on the determined data field type(s) and the search option(s) to be enabled. The network service can generate a search index for the data based at least in part on the index configuration.

Various other functions and advantages are described and suggested below as may be provided in accordance with the various embodiments.

Figure 1:
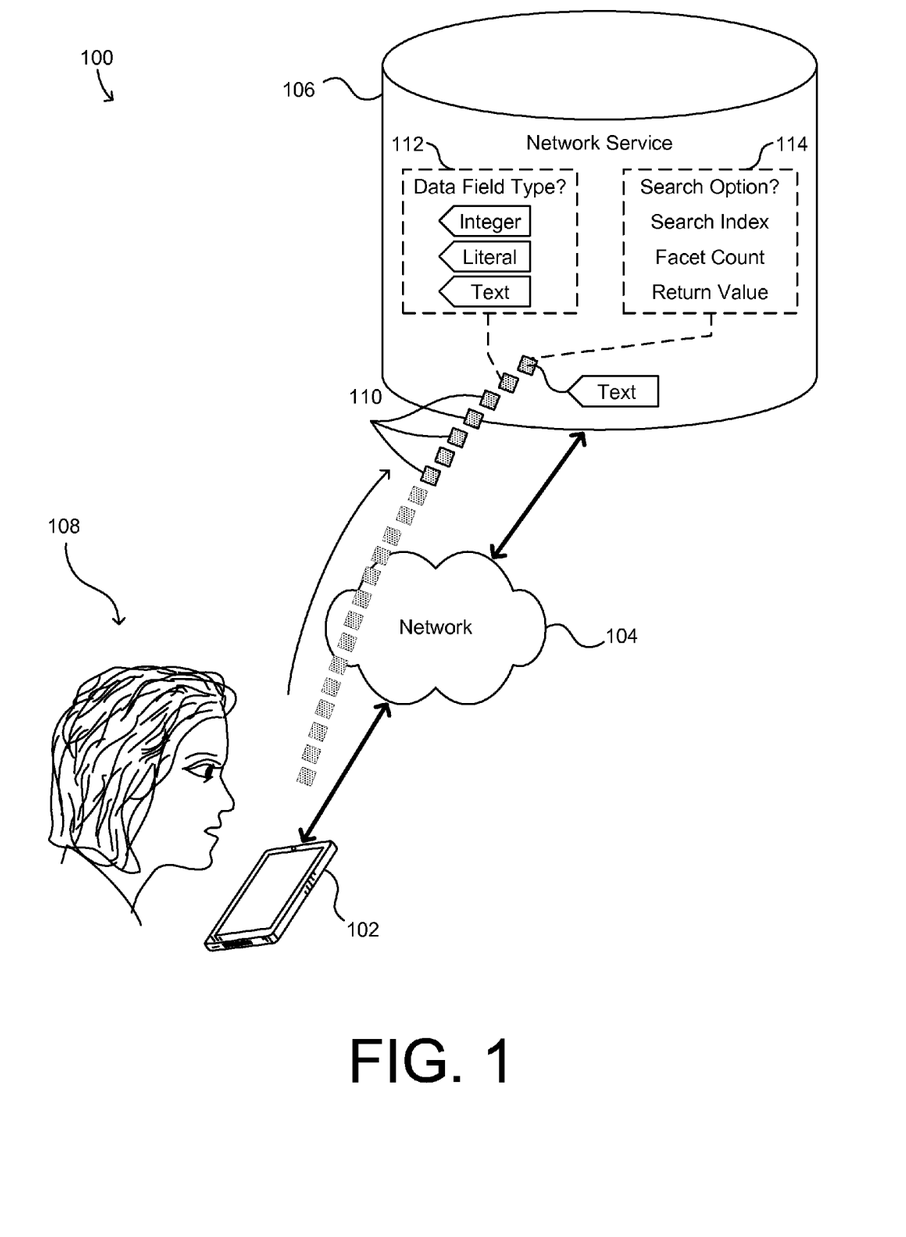
FIG. 1 illustrates an example environment in which aspects of the various embodiments can be utilized.

FIG. 1 illustrates an example environment 100 in which aspects of the various embodiments can be utilized. The example environment 100 can comprise at least one computing device 102, a network 104 (e.g., Internet, intranet, local network, local area network, etc.), and a network service 106 (i.e., network service provider, network based service, etc.). The at least one computing device 102 can be communicatively connected to the network service 106 over the network 104. In some embodiments, the computing device 102 can communicate the network service 106 without a network 104 such as the Internet. As shown in FIG. 1, there can also be a user 108 of the at least one computing device 102 or other entity (e.g., individual, company, organization, group, etc.) 108. The user or entity 108 can communicate data 110 from the at least one computing device 102 over the network 104 to the network service 106 (and vice versa).

In some embodiments, the network service 106 can comprise of and/or utilize one or more hosts or servers connected to the network 104. For example, the network service 106 can rent storage space to customers, such as the user of the device 102 or another entity(ies) (e.g., company, organization, group, individual, etc.) 108. Accordingly, the user/entity 108 of the computing device 102 can store data from the device 102 onto the network service 106 using the network 104. In other words, the user/entity 108 and/or device 102 can utilize network based computing storage via the network service 106.

In one example, the computing device 102 can transmit data 110 over the network 104 to be stored on the network service 106, as shown in FIG. 1. The data 110 can be any data utilized in network based computing, such as for search, database storage, running an application, running a virtual machine, running an operating system, etc. The computing device 102 can transmit the data 110 to be stored on a storage allocation provided by the service 106. For example, the user/entity 108 can purchase or rent storage space on the service 106 and the storage allocation can be allocated and assigned to the user/entity 108. In some embodiments, the user/entity 108 can have a particular account and/or storage allocation on the service 106; the storage space (e.g., storage allocation) allocated and assigned to the entity 108 can be associated with the account for the entity 108.

The entity 108 may also want the network service 106 to provide a search index for the data 110. Conventional approaches typically require the entity 108 to first provide a configuration (i.e., index configuration, schema, index setting, etc.) for the data 110 to be indexed, or conventional approaches can require a configuration/format (e.g., Search Data Format (SDF)) that the entity's data 110 must comply with, thus demanding the entity 110 to convert its data 110 to the required configuration. However, this can be inconvenient, cumbersome, or difficult to the entity 108.

In some embodiments, the entity 108 can transmit the data 110 to the network service 106, and the network service 106 can automatically (i.e., without an instruction or a request from the entity 108) analyze the data 110 and generate an index configuration (e.g., search index configuration, search index schema, etc.) for the data 110. For example, in some embodiments, the network service 106 can analyze the data 110 by determining a type of data field 112 for one or more data fields included in the data 110 and determining a search option 114 to be enabled for one or more data fields included in the data 110.

With regard to determining the type of data field 112, there can be a plurality of data field types that the data 110 (e.g., document, file, etc.) can be associated with, such as an integer type of data field, a literal type of data field, or a text type of data field, and so forth. In some embodiments, the data 110 can include a plurality of data fields, each data field including a value (e.g., data field "name" can have a value of "ABCD-Brand Shirt"; data field "Price" can have a value of "$20"; etc.). The network service 106 can analyze the plurality of data fields included in the data 110 to determine a data field type for each data field in the plurality.

For example, for each data field, the network service 106 can determine whether the value of each respective data field comprises an amount of integers above a specified integer amount threshold (e.g., value of data field "Price" is all integers); if so, then that respective data field can be determined to be of an integer data field type. The network service 106 can also determine whether a data field is of a literal data field type by, for example, determining at least one of a value associated with the data field having an amount of alphabetic characters above a specified lower literal amount threshold but below a specified upper literal amount threshold, a number of distinct values associated with the data field being below a specified literal distinct amount threshold, a percentage of distinct values being below a specified literal distinct percentage threshold, or a length of values being below a specified literal length threshold. In some embodiments, the network service 106 can, for example, consider the length of a data field value and the frequency and/or percentage of distinct values in the data field value to identify the data field as being of a text type; if there are many distinct values in a data field value and the data field value is very long (e.g., has a number of alphanumeric characters above a threshold), then the data field is likely of a text type. In some embodiments, if a data field is not of an integer type or a literal type, then the data field can be of a text type.

Regarding determining the search option 114, the network service 106 can determine one or more search options 114 to be enabled for (the data fields of) the data 110. For example, having determined a data field type for a data field included in the data 110, the network service 106 can determine whether or not to enable an option to include the data field in the search index to be generated, whether or not to enable an option to calculate a facet count for the data field, and/or whether or not to enable an option to return/provide a search value for the data type.

For example, if the data field type for a data field is determined to be a text (e.g., the data field is a "Product Description" and the value is a long paragraph), then the network service 106 can choose the option not to include the data field (and value) in the search index. In another example, for data field with an integer data field type (e.g., data field being "Production Year" and the value is a year), the network service 106 can choose to enable the option to include the data field in the search index to be generated, and the service 106 can enable the option to calculate a facet count for the data field. A facet count can be a count of how many search results fall into a certain category for a data field. For example, if the data field is "Production Year," the network service 106 can determine that it makes sense to provide a facet count, which indicates how many search results are associated with a certain category; e.g., "1984 (23), 2002 (12), 2010 (18)" shows an example of facet counts in which 23 search results are associated with "1984" with respect to the "Production Year" data field, 12 search results are associated with "2002," and 18 search results are associated with "2010."

In some embodiments, the network service 106 can also decide to enable the return of the value for a data field. For example, not all searchable data fields (and values) need to be returned (e.g., retrieved and presented) in response to a search request. The network service 106 can decide whether or not to return the value for a data field.

Turning now to the generating of a configuration for the data 110, the network service can automatically (i.e., without an instruction from the entity 108) generate a configuration (e.g., search index configuration, schema, etc.) for the data 110. In some embodiments, the configuration can, at least in part, help determine how to index the data 110; the index configuration can, at least in part, govern how the data 110 will be indexed. The configuration or schema can specify a data field type for each data field included in the data 110, indicate whether each data field is searchable, indicate whether each data field is rankable (e.g., sortable), and other similar information useful for building the index. Subsequent to generating the configuration for the data 110 to be indexed, the network service 106 can generate a search index for the data 110 based in at least part on the generated configuration.

Figure 2:
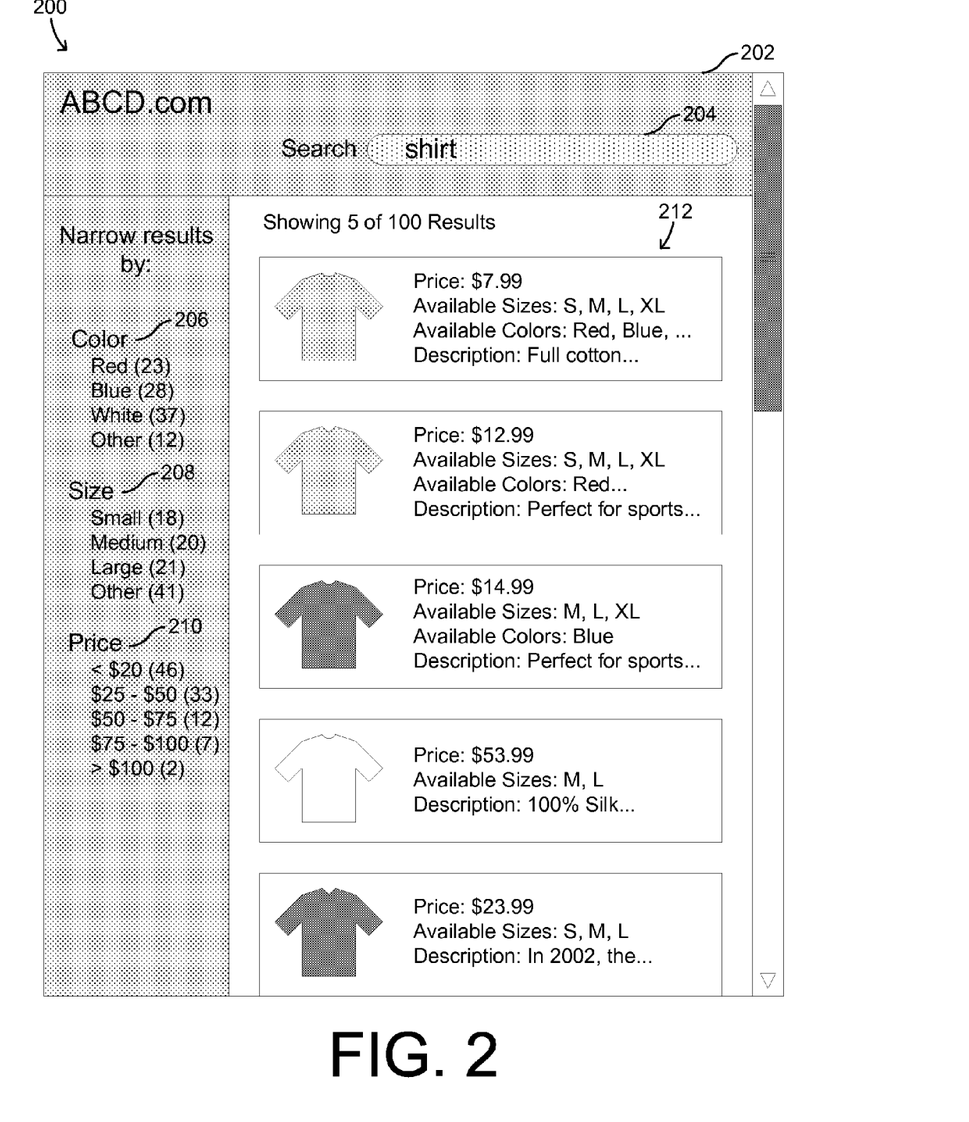
FIG. 2 illustrates an example system embodiment for index configuration for searchable data in a networked environment.

FIG. 2 illustrates an example web browsing environment 200 in which index configuration for searchable data in a networked environment can be utilized. The example web browsing environment 200 can comprise an example web page 202 being rendered by an application, such as a web browser. In this example, the web page 202 can be provided by a network service that is associated with the domain, ABCD.com.

A user/entity (e.g., customer of the network service) can be a retailer and can upload data that is related to selling shirts, for example. The data can be indexed and stored by the network service and made searchable to others such as potential customers of the user/entity. The network service can analyze the data to determine a type of data field (i.e., data field type) for each of the data fields included in the data. For example, the data related to the selling of shirts can include data fields such as "Color" 206, "Size" 208, "Price" 210, "Description," and other fields. The network service can analyze the value for each data field to determine a type for each respective data field. The network service can also determine one or more options (e.g., search options) to enable for each data field. The network service can subsequently generate a configuration/schema for the data to be indexed. Then the network service can generate an index for the data based on the configuration/schema.

For example, the network service can identify the data field "Color" and determine that its value (e.g., "Red," "Blue," "White," "Green," etc.) is alphabetic/literal and may identity the type of the "Color" data field to be a literal type. (In this example, the data associated with the "Color" data field and the values (e.g., "Red," "Blue," "White," "Green," etc.) can be uploaded by the entity.) In another example, the network service can identify a "Size" data field in at least a portion of the uploaded data and determine that the values contained in the "Size" data field are numeric values. In this instance, the network service may determine that the "Size" data field is an integer type. In a further example, the network service can identify the values for the "Description" data fields in at least a portion of the uploaded data and may determine that the values include both numbers and alphabetic characters, and/or that the values are lengthy in terms of the number of characters, and/or that the values have distinct terms/phrases/symbols. In this instance, the network service may determine that the "Description" data field is a text type.

Regarding the search options, the network service can determine, for each of the data fields, whether to not to enable the option to include a respective data field in the search index to be generated. For example, in some embodiments, the "Description" data fields (and corresponding values) can be omitted from the search index. If so, then when a query is run with respect to the search index, the query will not search the "Description" data field. However, some embodiments can and do include the "Description" data fields and values in the search index.

Moreover, the network service can determine whether or not to enable the option to calculate a facet count for each data field. As mentioned above, a facet count represents how many of the results matching a search query have a particular value (or range of values) for a particular data field. For example, as shown in FIG. 2, the "Color" data field with a value of "Red" has a facet count of 23 (i.e., 23 search results for a "Red" shirt), whereas the "Blue" value of the "Color" data field has a facet count of 28 (i.e., 28 search results for a "Blue" shirt), and so forth. In some embodiments, the values can overlap (i.e., do not have to be an exact match). For example, a shirt with blue and red stripes can be associated with both the "Blue" and "Red" values, and/or with other values. In some embodiments, the network service can determine that facet counts should be calculated for some of the data fields, but not necessarily all of the data fields. For example, the network service can determine that there should be facet counts for "Color," "Size," and "Price," but not for "Description."

Furthermore, the network service can determine whether or not to enable a return of the value for a data field. For example, there can be a data field "Internal Product Identification Number" included in the data, the value of the data field being a product identification number internal to the entity and not intended to be shown to a customer of the entity; as such, the network service can determine not to enable a return of the value for such a data field.

It is contemplated that there can be additional options as well as data related to other items that a person having ordinary skill in the art would recognize. For example, the network service can determine whether or not to enable an option to make a data field rankable (e.g., sortable). With reference to FIG. 2, in some embodiments, the "Price" data field can be ranked/sorted by its values (e.g., from lowest price to highest price, from highest price to lowest price, etc.), the "Color" data field can be sorted alphabetically (not illustrated in FIG. 2), and so forth. In another example (not illustrated), there can be data related to media files, such as music, videos, books, photographs, etc. Example data fields for the media files can include, but are not limited to, "Title," "Artist/Author," "Year Created," "Price," "Rating," etc.

Having determined the types of the data fields included in the data and the one or more search options for the data fields included in the data, the network service can generate a configuration (i.e., search index configuration, schema, etc.) for the data, the generating of the configuration being based at least in part on the determined data field types and search options.

Subsequent to generating the configuration, the network service can generate a search index for the data based at least in part on the generated configuration. Accordingly, the data provided by the entity can be stored with the network service and the search index for the data generated by the network service.

Figure 3:
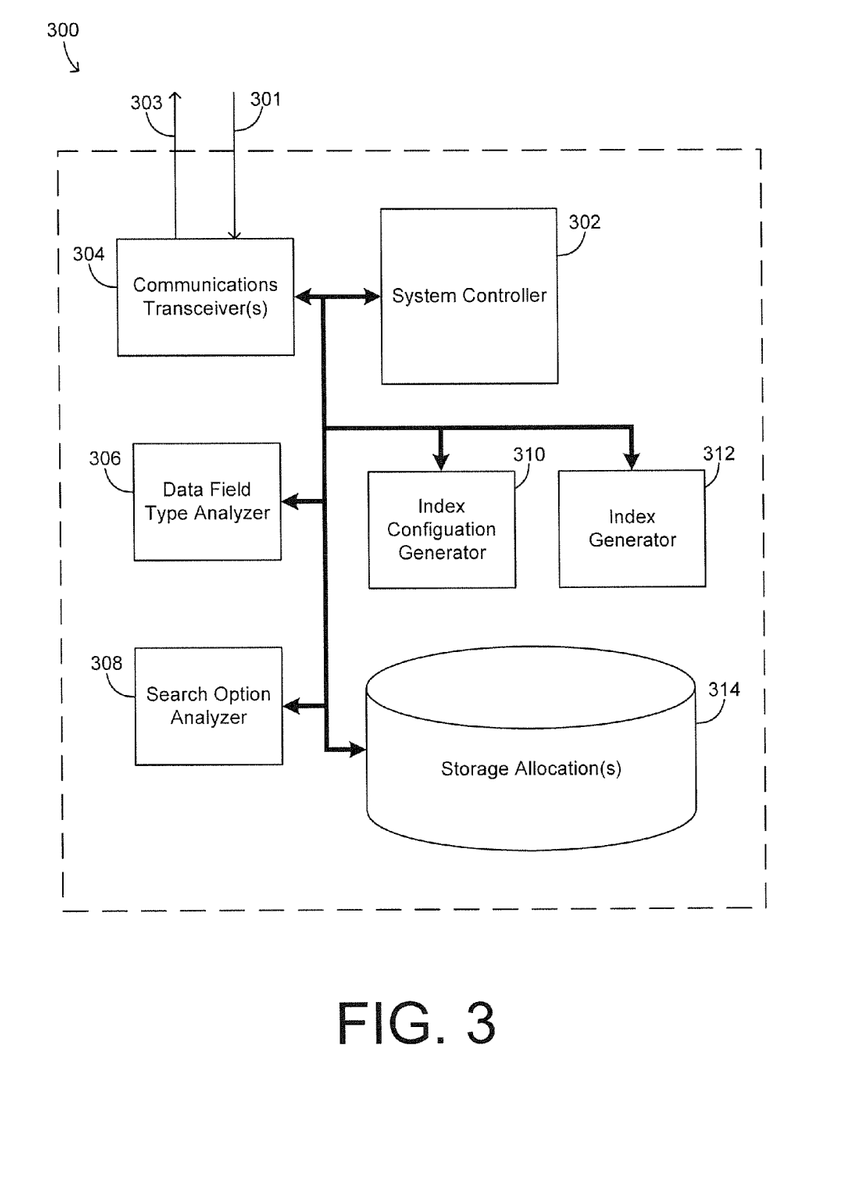
FIG. 3 illustrates an example web browsing environment in which index configuration for searchable data in a networked environment can be utilized.

FIG. 3 illustrates an example system embodiment 300 for index configuration for searchable data in a networked environment. The example system embodiment 300 can comprise a system controller 302, at least one communication transceiver 304, a data field type analyzer 306, a search option analyzer 308, an index configuration generator 310, an index generator 312, and at least one storage allocation 314.

The system controller 302 can facilitate the system to perform various operations for index configuration for searchable data in a networked environment. The system controller 302 can communicate with the at least one communications transceiver 304 to facilitate data transmission to 301 and/or data receipt from 303 one or more sources external to the system 300 as well as to facilitate data communication among the system.

Data received (e.g., from an entity) by the system 300 via the communications transceiver 304 can be analyzed by the data field type analyzer 306 to determine a type associated with each of the data fields included in the data. The data can also be analyzed by the search option analyzer 308 to determine whether or not to enable one or more search options with respect to each of the data fields included in the data. Based at least in part on the determined data field types and the one or more determined search options, the index configuration generator 310 can generate a search index configuration/schema. Then based at least in part on the generated search index configuration/schema, the index generator 312 can generate a search index for the data. The data and the search index generated for the data can be stored on one or more storage allocations 314.

It is contemplated that the various components and/or portions of the example system 300 can be implemented as hardware, software, or a combination of both. For example, the various parts of the system 300 can be implemented via a circuit, a processor, an application, a portion of programming code, an algorithm, or any combination thereof, etc. It is also contemplated FIG. 3 is an example and meant to be used for illustrative purposes only. For example, the various components do not have to be configured according to FIG. 3. In some embodiments, the various components do not have to be tightly coupled to one another and can instead be spread across a more distributed system. For example, a component such as the index generator can reside on a separate/different network and/or system, but still retain a communicative connection(s) to the other components.

Figure 4:
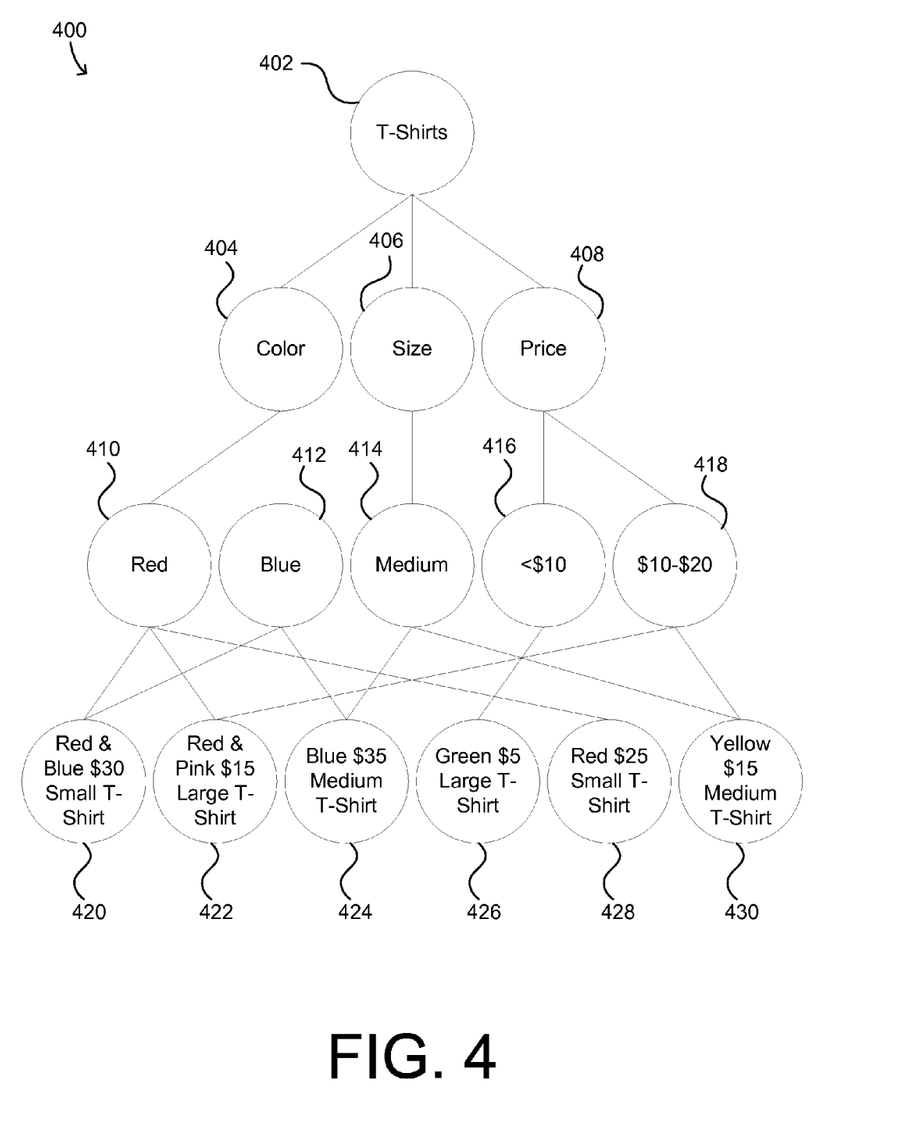
FIG. 4 illustrates an example search index that can be generated in accordance with the various embodiments.

FIG. 4 illustrates an example search index 400 that can be generated in accordance with the various embodiments of the present disclosure. With reference to FIG. 4, there can be a root node 402 in the search index. In the example of FIG. 4, data can be uploaded by an entity such as a T-Shirt retailer. The data can correspond to information about the T-Shirts (root node 402) that the entity has made available for sale. There can be parent nodes (e.g., 404, 406, 408) that represent data fields for the data relating to the T-Shirts. For example, the T-Shirts can have a Color data field 404, a Size data field 406, and a Price data field 408.

Continuing with the example of FIG. 4, the data fields can have child nodes (e.g., 410, 412, 414, 416, 418) that represent values within each respective data field. For example, there can be at least two Colors (Red 410 and Blue 412), one Size (Medium 414), and two Price ranges (<$10 416 and $10-$20 418). There can also be a set of search results/items (e.g., T-Shirts 420, 422, 424, 426, 428, 430) that can correspond to one or more of the data fields and values.

In this example, all three data fields (Color 404, Size 406, and Price 408) are to be included in the search index, can have facet counts, and can provide/return values in response to relevant search queries. For example, as shown in FIG. 4, Color:Red 410 can have a facet count of three and Color:Blue 412 can have a facet count of two. Size:Medium 414 can have a facet count of two. Price:<$10 416 can have a facet count of one and Price:$10-$20 418 can have a facet count of two. Moreover, a search query of Color:Red 410, for example, will return T-Shirts 422, 424, and 428; searching for Red 410 and Blue 412, for example, will return T-Shirt 422; and so forth. Although the example search index 400 is shown as a being a tree structure, it is contemplated that the search index can be generated in many other ways and/or with other structures.

Figure 5:
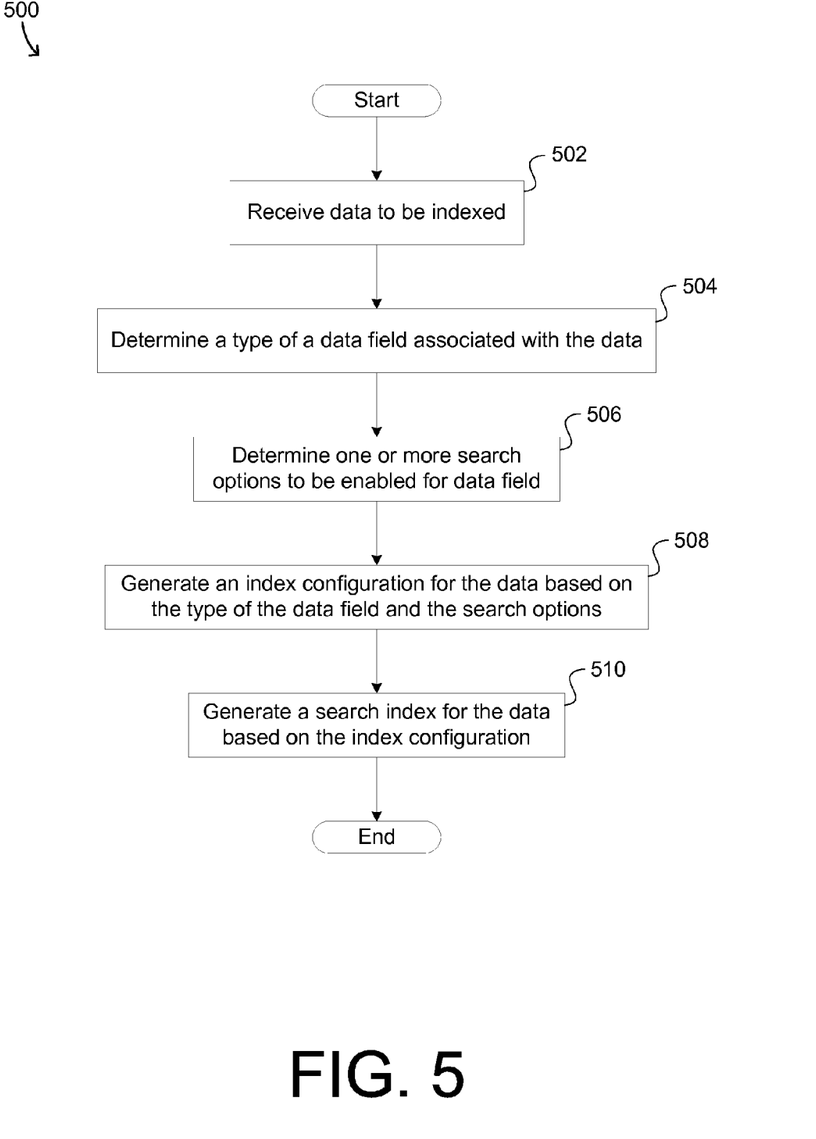
FIG. 5 illustrates an example method embodiment for index configuration for searchable data in a networked environment.

FIG. 5 illustrates an example method embodiment 500 for index configuration for searchable data in a networked environment. Again, it should be understood that there can be additional, fewer, or alternative steps performed in similar or alternative orders, or in parallel, within the scope of the various embodiments unless otherwise stated. At step 502, the example method embodiment 500 can receive data to be indexed. For example, the method 500 can receive data, uploaded by an entity, to be indexed and the data can include a plurality of data fields (or at least one data field). In some embodiments, the example method can also determine a name for a data field associated with the data. At step 504, the example method 500 can determine a type of a data field associated with the data. For example, the method can determine a field type, of a plurality of field types, associated with each data field in the plurality of data fields. The plurality of field types can include (but is not limited to) at least one of an integer type, a literal type, or a text type. The type of the data field can be determined from a plurality of types of data fields. In some embodiments, the plurality of data fields and their types and/or names can be identified based on tags, signals, or other indications. The method 500 can determine one or more search options to be enabled with respect to the data field associated with the data, at step 506. For example, the one or more search options can include at least one of an option to include a respective data field in a search index to be generated, an option to calculate a facet count for the respective data field, or an option to provide one or more values associated with the respective data field. Step 508 can include generating an index configuration for the data based at least in part on the type of the data field and the one or more search options. Then at step 510, the method 500 can generate a search index for the data based at least in part on the index configuration for the data. In some embodiments, the search index can be generated based on whether the data is structured data, free text data, or a combination of both. In some embodiments, the example method can also provide at least one of the data, the index configuration, or the index to be searchable by one or more search queries.

There can be various other information included in index configurations. For example, a configuration can hold information regarding whether a data field is facetable or not (i.e., whether or not a facet count should be calculated for the data field), whether a data field is rankable or not (i.e., whether or not the values of search results having the data field should be sorted), etc.

In some embodiments, the network service can convert data received/uploaded in a first format to a second format, the second format being compatible with the search index and can store the data converted to the second format on one or more storage allocations. For example, the network service can receive data from the entity, the data capable of having any one or more of several various formats, such as .PDF, .DOC, .DOCX, .CSV, .JSON, .XML, etc. The network service can automatically convert the data into a format compatible with (e.g., recognizable by, workable with, etc.) the network service, such as the Search Data Format (SDF).

In some embodiments, the network service can covert the data based on comparing the first format with the second format and modifying at least one data field associated with the first format to correspond to at least one data field associated with the second format. For example, the network service can compare a format(s) of the data received from the entity and modify/update the format such that it is compatible with the network service. This can include identifying whether one or more data fields in the format should be added, removed, or changed.

In some embodiments, the network service can determine a type of a data field to be the integer type based on determining that a value associated with the data field has an amount of integer characters above a specified integer amount threshold. Also, the network service can determine a type of a data field to be the literal type determining at least one of a value associated with the data field having an amount of alphabetic characters above a specified lower literal amount threshold but below a specified literal amount threshold, a number of distinct values associated with the data field being below a specified literal distinct amount threshold, a percentage of distinct values being below a specified literal distinct percentage threshold, or a length of values being below a specified literal length threshold. Further, the network service can determine a type of a data field to be the text type based on determining that a value associated with the data field has at least one of an amount of integer and alphabetic characters above a specified text amount threshold, a number of distinct characters above a specified text distinct amount threshold, a percentage of distinct characters above a specified text distinct percentage threshold, or a length of characters above a specified text length threshold.

In some embodiments, the network service can decide to enable the option to include a data field in a search index to be generated, the decision being based at least in part on receiving a signal included in the data field indicating that the data field is to be included in the search index. The network service can also decide to enable the option to calculate a facet count for a data field, the decision being based at least in part on determining that a quantity for at least one value associated with the data field is above a specified facet count lower threshold and below a specified facet count upper threshold. The network service can further decide to enable the option to provide a value associated with a data field in response to a relevant search query, the decision being based at least in part on receiving a signal included in the data field indicating that the value associated with the data field is to be provided.

In some embodiments, one or more search queries (e.g., terms in the search query) can be utilized by the network service. For example, the network service can infer from the search queries that a searcher is faceting on a particular data field. As a result, the network service can determine that the data field should be of a literal type, for example.

In some embodiments, when a searcher inputs query terms and requests a search, one or more search results can be presented in a particular rank expression (e.g., order of results), such as by relevance. The present disclosure can allow for creations more complicated rank expressions that take into account other factors such as query independent factors (e.g., there can be a popularity data field included within the data, etc.). The present disclosure can also allow for analysis to propose rank expressions that can be used, by looking at the data and determining that a data field is meaningful in terms of popularity. For example, there can be a text body data field type and its length (e.g., or the inverse of its length) can be taken into account and can provide useful information for rank expressions.

In some embodiments, data field types can also include a geolocation type, a time type, a date type, or a floating point number type.

Various embodiments consistent with the present disclosure can also utilize sample data. For example, the user/entity can first provide sample data to the network service. The network service can analyze the sample data to determine types of data fields and search options. Based on the data field types and search options for the sample data, the network service can generate an index configuration, and subsequently generate a search index based on the generated index configuration.

Figure 6:
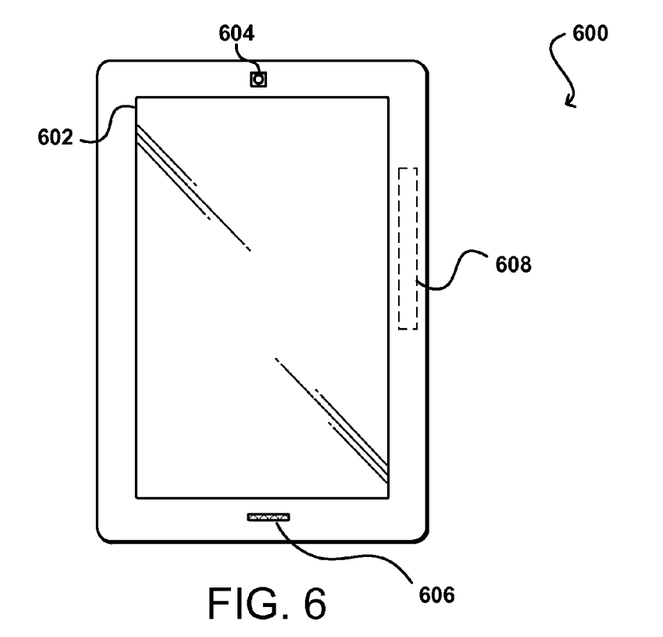
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device 600 can be an analog device, such as a device that can perform signal processing using operational amplifiers. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
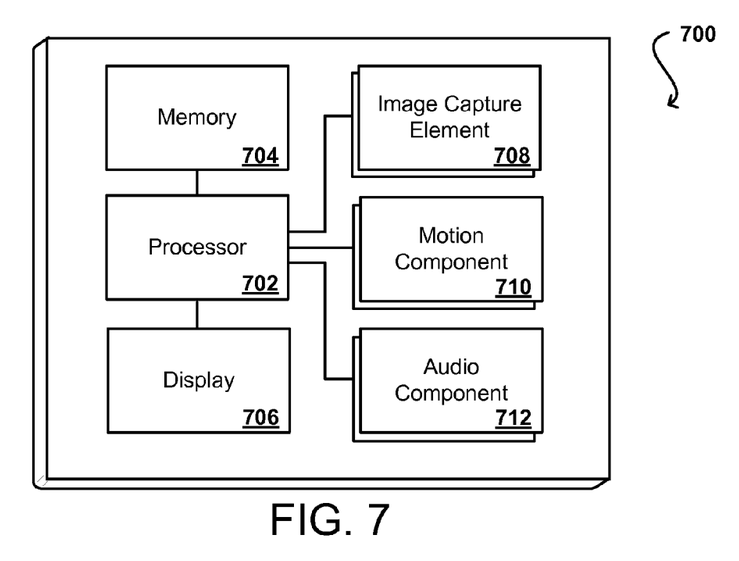
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 712, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
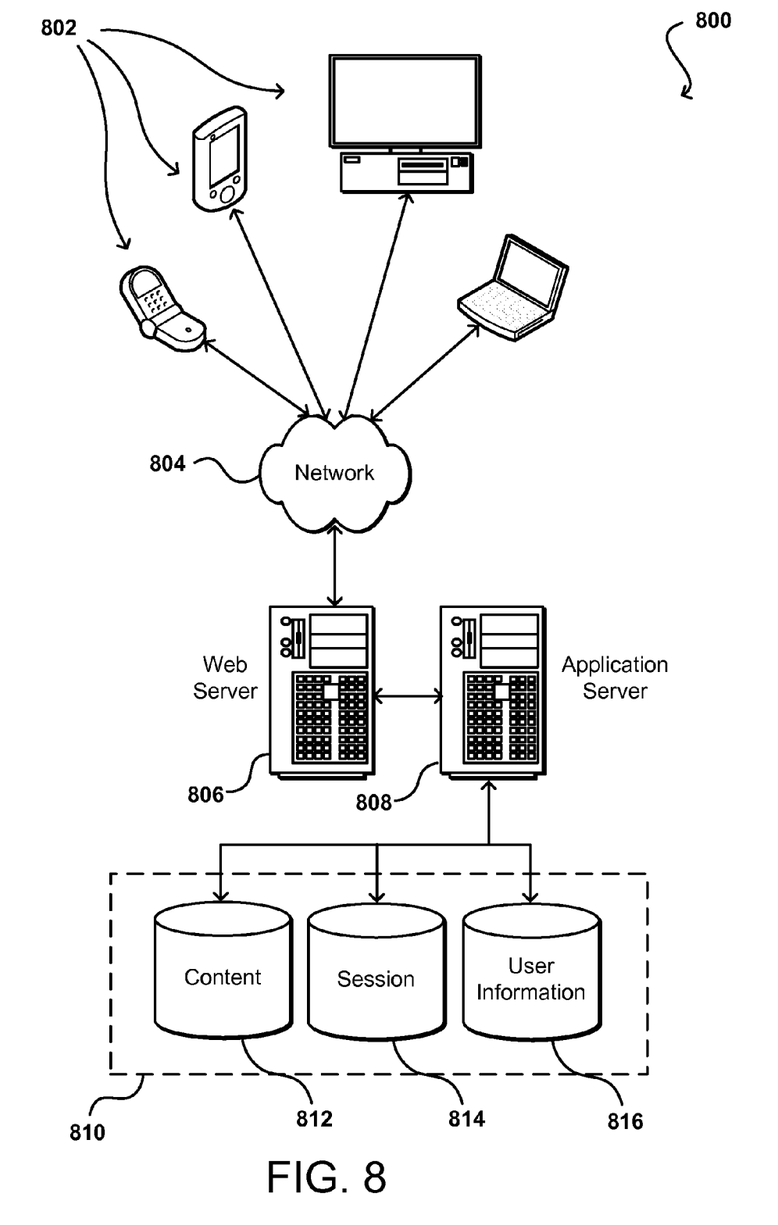
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy teiininals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
    at least one communications transceiver;
    one or more storage allocations;
    at least one processor; and
    a memory device including instructions that, when executed by the at least one processor, cause the system to:
    receive, via the at least one communications transceiver, data of a first format to be indexed, the data including a plurality of data fields;
    analyze data in each of the plurality of data fields to determine a value associated with each data field, each respective value corresponding to one of an amount of integer characters reaching an integer threshold, an amount of alphabetic characters being within a specified literal amount range, or an amount of integer and alphabetic characters above a text amount threshold;
    determine from a plurality of types of data fields, a type of a data field for each of the plurality of data fields; determine one or more search options to be enabled for each data field of the plurality of data fields based at least in part on the type of the data field for each of the plurality of data fields, the one or more search options including an option to include a respective data field in a search index;
    generate an index configuration for the data based at least in part on the one or more search options;
    generate a search index for the data based at least in part on the index configuration for the data; and
    convert the data from the first format to a second format to generate converted data, the second format being compatible with the search index, wherein the converted data is stored in at least one storage location.

2. The system of claim 1, wherein the instructions to convert the data from the first format to the second format cause the system to further:
    compare the first format with the second format; and
    modify at least one data tag associated with the first format to correspond to at least one data tag associated with the second format.

3. The system of claim 1, wherein the instructions to determine the type of the data field cause the system to further:
    determine that a value associated with the data field has an amount of characters above a specified character-type threshold; and
    determine the type of the data field to be a type corresponding to the character-type threshold.

4. The system of claim 3, wherein the plurality of types of data fields includes at least one of an integer type, a text type, a literal type, a geolocation type, a time type, a date type, or a floating point number type.

5. The system of claim 4, wherein the character-type threshold includes:
    an integer amount threshold;
    a text amount threshold;
    a text distinct amount threshold;
    a text distinct percentage threshold; and
    a text length threshold.

6. The system of claim 1, wherein the one or more search options include at least one of an option to include the data field in the search index to be generated, an option to calculate a facet count for the data field, or an option to provide a value associated with the data field in response to a relevant search query.

7. The system of claim 6, wherein the determining the one or more search options to be enabled comprises:
    enabling the option to include the data field in the search index to be generated, based at least in part on receiving an input indicating that the data field is to be included in the search index or determining a type of the data field to be a literal type;
    enabling the option to calculate the facet count for the data field, based at least in part on determining that a quantity for a distribution of a plurality of values associated with the data field is below a specified facet count upper threshold; or
    enabling the option to provide the value associated with the data field in response to the relevant search query, based at least in part on at least one of receiving a signal included in the data field indicating that the value associated with the data field is to be provided or determining that a length of the value associated with the data field is below a specified return value length threshold.

8. A computer-implemented method comprising:
    receiving data to be indexed, the data including a plurality of data fields;
    analyzing data in a first format in each of the plurality of data fields to determine a value associated with each data field, each respective value corresponding to one of an amount of integer characters reaching an integer threshold, an amount of alphabetic characters being within a specified literal amount range, or an amount of integer and alphabetic characters above a text amount threshold;
    determining from a plurality of types of data fields, a type of a data field for each of the plurality of data fields;
    determining one or more search options to be enabled for each data field of the plurality of data fields based at least in part on the type of the data field for each of the plurality of data fields, the one or more search options including an option to include a respective data field in a search index;
    generating an index configuration for the data based at least in part on the one or more search options;
    generating a search index for the data based at least in part on the index configuration for the data; and
    converting the data from the first format to a second format to generate converted data, the second format being compatible with the search index, wherein the converted data is stored in at least one storage location.

9. The computer-implemented method of claim 8, wherein the converting the data from the first format to the second format comprises:
    comparing the first format with the second format; and
    modifying at least one data tag associated with the first format to correspond to at least one data tag associated with the second format.

10. The computer-implemented method of claim 8, wherein the determining the type of the data field comprises:
   determining that a value associated with the data field has an amount of characters above a specified character-type threshold; and
   determining the type of the data field to be a type corresponding to the character-type threshold.

11. The computer-implemented method of claim 10, wherein the plurality of types of data fields includes at least one of an integer type, a text type, a literal type, a geolocation type, a time type, a date type, or a floating point number type.

12. The computer-implemented method of claim 11, wherein the character-type threshold includes:
   an integer amount threshold;
   a text amount threshold;
   a text distinct amount threshold;
   a text distinct percentage threshold; and
   a text length threshold.

13. The computer-implemented method of claim 8, wherein the one or more search options include at least one of an option to include the data field in the search index to be generated, an option to calculate a facet count for the data field, or an option to provide a value associated with the data field in response to a relevant search query.

14. The computer-implemented method of claim 13, wherein the determining the one or more search options to be enabled comprises:
   enabling the option to include the data field in the search index to be generated, based at least in part on receiving an input indicating that the data field is to be included in the search index or determining a type of the data field to be a literal type;
   enabling the option to calculate the facet count for the data field, based at least in part on determining that a quantity for a distribution of a plurality of values associated with the data field is below a specified facet count upper threshold; or
   enabling the option to provide the value associated with the data field in response to the relevant search query, based at least in part on at least one of receiving a signal included in the data field indicating that the value associated with the data field is to be provided or determining that a length of the value associated with the data field is below a specified return value length threshold.

15. A computer-implemented method comprising:
   receiving data to be indexed, the data including a plurality of data fields;
   analyzing data in a first format in each of the plurality of data fields to determine a value associated with each data field, each respective value corresponding to one of an amount of integer characters reaching an integer threshold, an amount of alphabetic characters being within a specified literal amount range, or an amount of integer and alphabetic characters above a text amount threshold;
   determining from a plurality of types of data fields, a type of a data field for each of the plurality of data fields;
   enabling one or more search options for each of the data fields of the plurality of data fields based at least in part upon the type of the data field for each of the plurality of data fields, the one or more search options including an option to include a respective data field in a search index;
   generating an index configuration for the data based at least in part on the one or more search options;
   generating a search index for the data based at least in part on the index configuration for the data
   converting the data from the first format to a second format to generate converted data, the second format being compatible with the search index, wherein the converted data is stored in at least one storage location.

16. The computer-implemented method of claim 15, wherein the converting the data from the first format to the second format comprises:
   comparing the first format with the second format; and
   modifying at least one data tag associated with the first format to correspond to at least one data tag associated with the second format.

17. The computer-implemented method of claim 15, wherein the one or more search options include at least one of an option to include a respective data field in a search index to be generated, an option to calculate a facet count for the respective data field, or an option to provide one or more values associated with the respective data field.

* * * * *